Aug. 29, 1967  R. P. JONES  3,338,178
SELECTIVE SWITCHING FOR FLOOR TRUCK TOW LINES
Filed April 30, 1965  6 Sheets-Sheet 1

INVENTOR.
ROLAND P. JONES
BY Farley, Forster & Farley
ATTORNEYS

Aug. 29, 1967 R. P. JONES 3,338,178
SELECTIVE SWITCHING FOR FLOOR TRUCK TOW LINES
Filed April 30, 1965 6 Sheets-Sheet 2

INVENTOR.
ROLAND P. JONES
BY
Farley, Forster & Farley
ATTORNEYS

Aug. 29, 1967  R. P. JONES  3,338,178
SELECTIVE SWITCHING FOR FLOOR TRUCK TOW LINES
Filed April 30, 1965  6 Sheets-Sheet 4

INVENTOR.
ROLAND P. JONES
BY
Farley, Forster & Farley
ATTORNEYS

United States Patent Office 3,338,178
Patented Aug. 29, 1967

3,338,178
SELECTIVE SWITCHING FOR FLOOR TRUCK TOW LINES
Roland P. Jones, Wayne, Mich., assignor to Jervis B. Webb Company, a corporation of Michigan
Filed Apr. 30, 1965, Ser. No. 456,022
23 Claims. (Cl. 104—130)

This application is a continuation-in-part of my prior application S.N. 393,624, filed Sept. 1, 1964, now abandoned.

This invention relates to an improved construction for selectively switching a floor truck from a main to a branch line of a tow line system which is of the type where a floor truck is diverted into a branch line guide slot by engagement between a diverter member on the truck and a fixed reaction member in the path of travel along the main line guide slot rather than by positioning a movable switch tongue to produce diverting movement.

According to the invention, a device for diverting the drive pin of a floor truck from the guide slot of a tow line along which the floor truck is propelled by a pusher of the tow line into an intersecting guide slot comprises a diverter member, means mounting the diverter member on the floor truck for movement between a raised position and a lower position, latch means for retaining the diverter member in the raised position thereof, means for selectively releasing the latch means to permit the diverter member to move to the lower position, and a reaction member mounted in the path of floor truck travel adjacent the intersecting guide slot for engagement by the diverter member in the lower position thereof to move the floor truck drive pin laterally out of engagement with the tow line pusher and into the intersecting guide slot.

A resetting device may be employed to return and latch the diverter member in the raised position as the floor truck moves along the intersecting guide slot.

Operation of all components of the device of the invention is mechanical in nature so that the invention provides a mechanical type of selective switching system enabling a floor truck to be dispatched and diverted into any intersecting guide slot along a tow line and eliminates the need for movable switch tongues, mechanism for controlling their position, and the expense of installing and maintaining such equipment.

Other features and advantages of the invention will appear from the following description of the presently preferred representative embodiment shown in the accompanying drawings in which.

Figure 1:
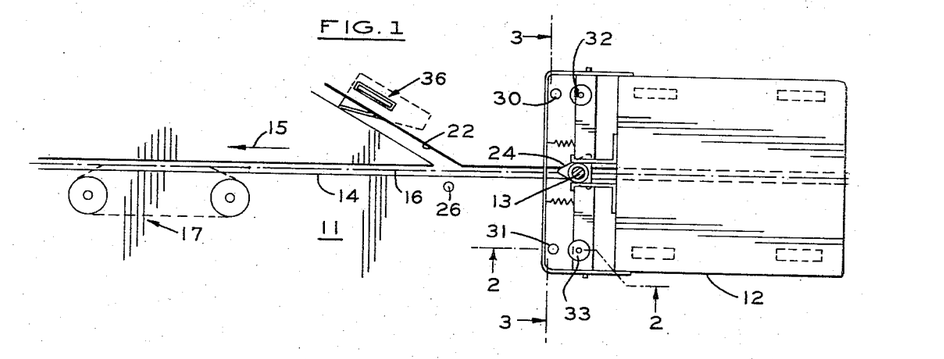
FIGURE 1 is a schematic plan view showing a floor truck approaching a junction between main and branch line guide slots.
Figures 2, 6, 7:
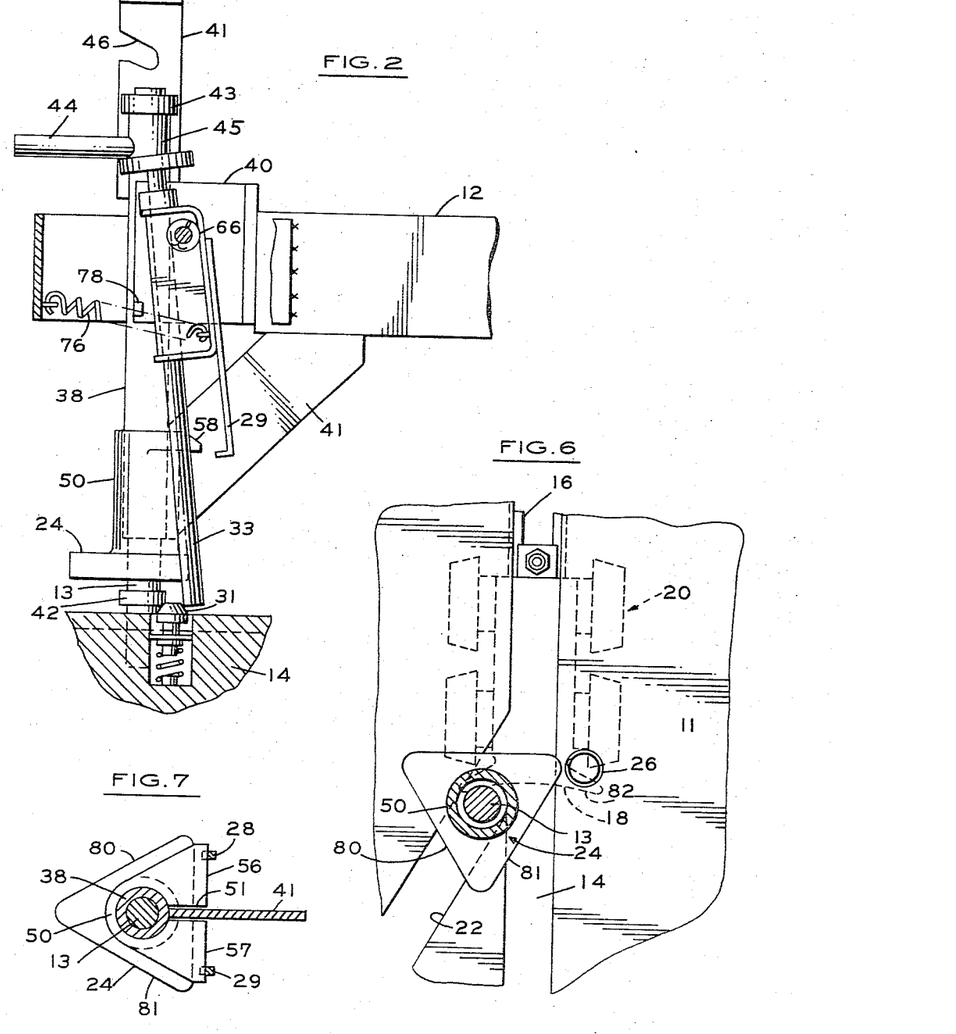
FIGURE 2 is an enlarged sectional elevation taken substantially as indicated by the line 2—2 of FIG. 1 showing the floor truck drive pin and diverter member mounted on the front of the floor truck, the floor truck being advanced toward the junction from the position shown in FIG. 1.
FIGURE 6 is a sectional plan view taken as indicated by the line 6—6 of FIG. 5 and showing the floor truck drive pin entering the branch guide slot.
FIGURE 7 is a sectional view taken as indicated by the line 7—7 of FIG. 5.

Referring to FIG. 1, a floor truck 12, equipped with a depending drive pin 13, is propelled in the direction of the arrow 15 along a surface 11 in a path defined by a main line guide slot 14 by a sub-floor tow line of conventional construction and including a chain 16 driven by a drive unit 17 and connected to trolleys, some of which are provided with a pusher 18 for engaging the truck drive pin 13 as is the trolley 20 illustrated in FIG. 6. A branch line guide slot 22 intersects the main guide slot 14 and may or may not be provided with a sub-floor tow line.

The general object of the present invention is to provide a device for selectively diverting an approaching floor truck from the main guide slot 14 to the branch guide slot 22, or to one of other branch guide slots extending to either side of the main guide slot along the length thereof. This device includes a wedge-shaped diverter member 24 mounted on the truck, and a fixed reaction member 26 mounted adjacent the intersection of the main and branch guide slots. The wedge-shaped diverter 24 is mounted on the floor truck for movement between a raised inoperative position shown in FIG. 8 in which it is normally retained by a pair of latches 28, 29, and in this position the diverter 24 cannot engage the reaction member 26. Trip buttons 30 and 31 are mounted in the floor surface 11 in advance of the junction between the main and branch guide slots 14 and 22 in coded relation to the center-line of the main guide slot. When selector pins 32 and 33 mounted on the floor truck are properly positioned with relation to the guide slot, they engage the trip buttons (see FIG. 2) as the floor truck approaches the junction between main and branch guide slots causing the latches 28, 29 to be released and permitting the diverter 24 to fall by gravity to a lower operative position in which it will engage the reaction member 26. A resetting device 36 may be installed along the branch guide slot 22 for returning the diverter 24 to normal position. Details of the construction of these components of the device will now be given.

Figure 3:
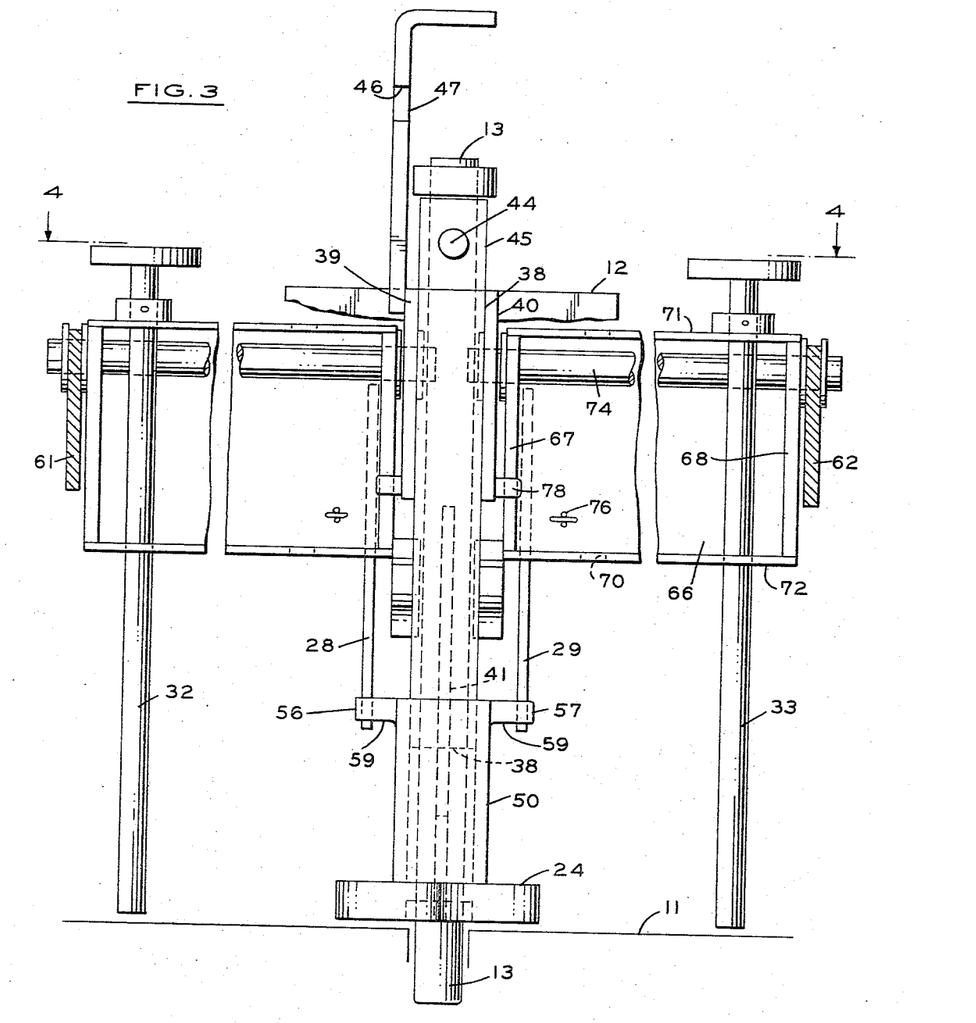
FIGURE 3 is an enlarged sectional elevation of the front of the floor truck taken as indicated by the line 3—3 of FIG. 1.
Figures 4, 5:
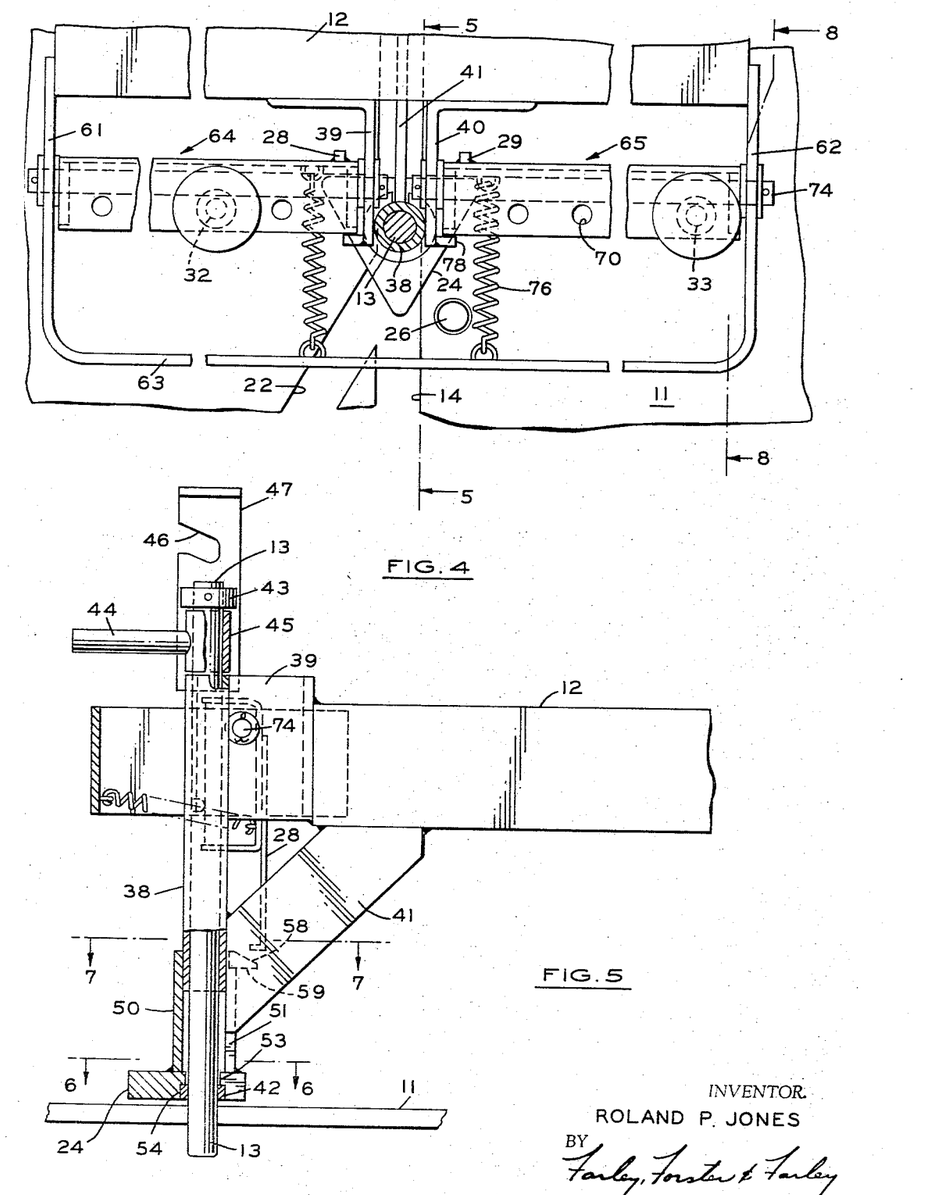
FIGURE 4 is a plan view showing the front end of a floor truck at the junction between main and branch guide slots.
FIGURE 5 is a sectional side elevation taken as indicated by the line 5—5 of FIG. 4.

Referring to FIGS. 2–7, the drive pin 13 is slidably mounted for vertical movement in a sleeve 38 rigidly secured to the front of the truck 12 by a pair of angle brackets 39 and 40 which engage the sides of the sleeve 38 at the upper portion thereof, and by a downwardly and forwardly extending plate 41 secured to the bottom of the truck 12 and to the lower portion of the sleeve as best shown in FIGS. 4 and 5. A collar 42 is secured to the lower end portion of the drive pin 13; a second collar 43 is secured to the upper end thereof; and an operating handle 44 is secured to a tube 45 which is loosely mounted on the drive pin 13 between the upper end of the sleeve 38 and the upper collar 43. The drive pin 13 is thus rotatably and slidably mounted in the sleeve 38 and may be manually raised to a position of disengagement with a guide slot by lifting the handle 44 and placing it in engagement with a notch 46 in a retainer 47.

The diverter member 24 includes an upwardly extending tubular portion 50 internally dimensioned for sliding engagement with the sleeve 38 and formed with a vertical slot 51 which straddles the sleeve mounting plate 41; and the lower portion of the diverter member 24 is provided with a bore 53 dimensioned for sliding engagement with the drive pin 13 and with a counterbore 54 for nested engagement with the lower collar 42 of the drive pin, which collar defines the lowered or operative position of the diverter member shown in FIG. 5. A pair of latch elements 56 and 57 (FIG. 7) project rearwardly from the upper portion of the tubular portion 50 of the diverter member, and each latch element includes an upper sloping camming surface 58 (FIG. 5) and a lower latch surface 59.

A U-shaped bumper 60 is mounted on the front of the truck and includes side portions 61 and 62 and a transverse portion 63. Racks 64 and 65 for supporting the selector pins 32 and 33 respectively are each pivotally mounted between one of the bumper side portions 61 and 62 and one of the drive pin mounting brackets 39 and 40. This construction is best shown in FIGS. 3 and 4, and since the construction and mounting of the racks 64 and 65 are identical, only one will be described in detail.

Referring to the rack 65, this consists of a U-shaped member 66 provided with plates 67 and 68 at the ends thereof and with a series of selector pin mounting holes 70 formed in the upper and lower flanges 71 and 72 of the U-shaped member 66. The rack 65 is pivotally mounted on a pin 74 supported at one end by the angle bracket 40 and at the other end by the bumper side portion 62. A spring 76 normally urges the rack 65 in a clockwise direction about the pin as the parts are shown in FIG. 2 to a latching position defined by engagement between the rack end plate 67 and a lug 78 secured to the angle bracket 40. The latch 29 is secured to the rear face of the channel member 66. Latch 28 is similarly mounted on a selector pin rack 64.

Both of the trip buttons 30 and 31 are mounted in the floor surface 11 in advance of junction between guide slots and in transverse alignment normal to the path of travel of the floor truck so that the selector pins 32 and 33, when mounted in the proper holes 70 in the racks 64 and 65 for the trip button positions at a particular junction, simultaneously engage the trip buttons as the floor truck approaches that station. This engagement produces pivotal movement of the racks 64 and 65 to a releasing position as illustrated in FIG. 2, causing the latches 28 and 29 to disengage from the latch elements 56 and 57 on the upper end of the wedge member or diverter 24. The diverter falls against the collar 42 on the lower end of the drive pin 13 to an operative position in which one of the side wedge surfaces 80 or 81 of the diverter will engage a reaction member 26.

The result of such engagement is shown in FIG. 6. As the floor truck drive pin 13 is moved forward by a pusher 18, the engagement between one of the side surfaces 80 or 81 of the diverter and the side surface of the reaction member 26 imparts progressive lateral movement to the drive pin 13 to divert it into the entrance of the branch guide slot 22. Wings 82 on the pusher 18 extend laterally to either side of the guide slot 14 and overlap the entrance to the branch guide slot 22 to insure sufficient lateral movement of the drive pin 13 to position it in the branch guide slot.

Figure 8:
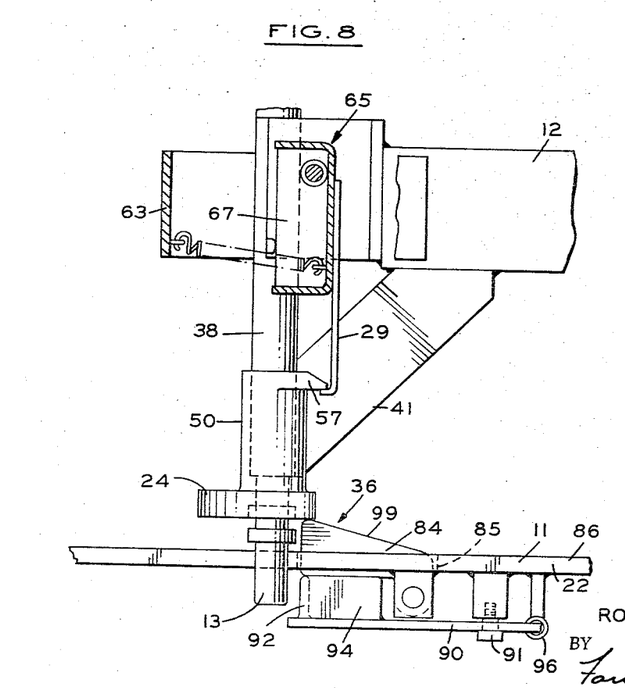
FIGURE 8 is a sectional elevation taken as indicated by the line 8—8 of FIG. 4 but showing the floor truck diverter member being reset.
Figure 9:
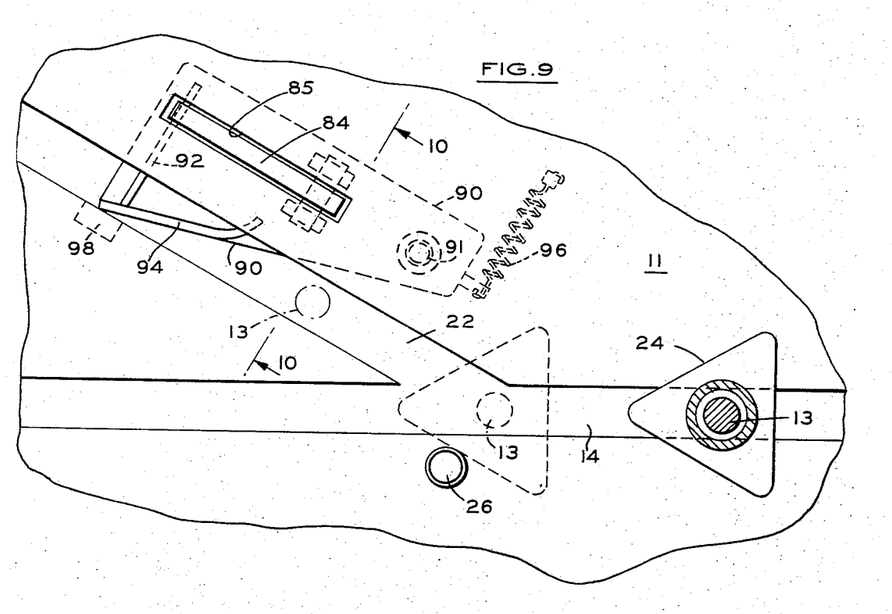
FIGURE 9 is a schematic plan view of the intersection of main and branch guide slots showing the resetting mechanism installed on the branch line guide slot.
Figure 10:
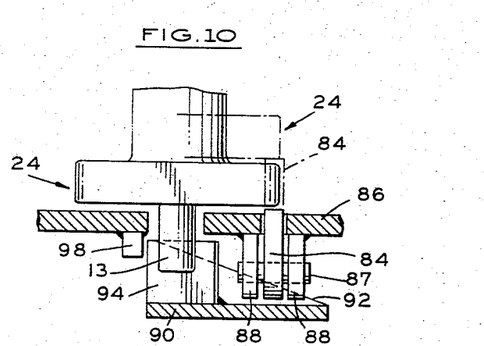
FIGURE 10 is a sectional elevation of the resetting mechanism taken on the line 10—10 of FIG. 9.

The resetting device 36 automatically returns the diverter 24 to its upper inoperative position in response to movement of the drive pin of a floor truck along the branch guide slot 22. Referring to FIGS. 8–10, the resetting device includes a resetting cam 84 pivoted in a slot 85 in a floor member 86 on a pin 87 carried between a pair of brackets 88 which are secured to the underside of the floor plate 86. An actuating member 90 is mounted on a vertical pivot 91 so as to extend beneath the cam 84, and is provided with a wedge-shaped vertical rib 92, engaging the lower side of the cam 84, and with a vertically extending side flange 94 which projects upwardly into the path of movement of a tow pin 13. The member 90 is urged by a spring 96 to a normal position in which the side flange member 94 engages an abutment 98. In this normal position of the actuating member 90, the upper face 99 of the resetting cam 84 lies substantially flush with the upper surface of the floor 11 and offers no obstruction to traffic thereover.

The tow pin 13 of a diverted floor truck in moving along the guide slot 22 encounters the upwardly extending side flange 94 of the actuating member 90 causing the member 90 to pivot and the wedge-shaped rib 92 to move the resetting cam 84 upwardly into the path of travel of the diverter as shown in FIG. 8. Continued advance movement of the floor truck drive pin 13 results in the diverter 24 engaging the inclined surface 99 of the resetting cam 84 and sliding upwardly on the sleeve 38 until the latch elements 56 and 57 move past the lower ends of the latches 28 and 29 and are reengaged thereby.

Installation of the resetting device 36 is optional. In many instances a floor truck which has been diverted to a branch guide slot will be removed manually by raising the drive pin 13 out of the guide slot with the operating handle 44. When the drive pin is so raised manually, the upward movement of the drive pin is transmitted through the lower collar 42 to the diverter 24 and results in the diverter being reengaged with the latches and reset to its inoperative position.

Figure 11:
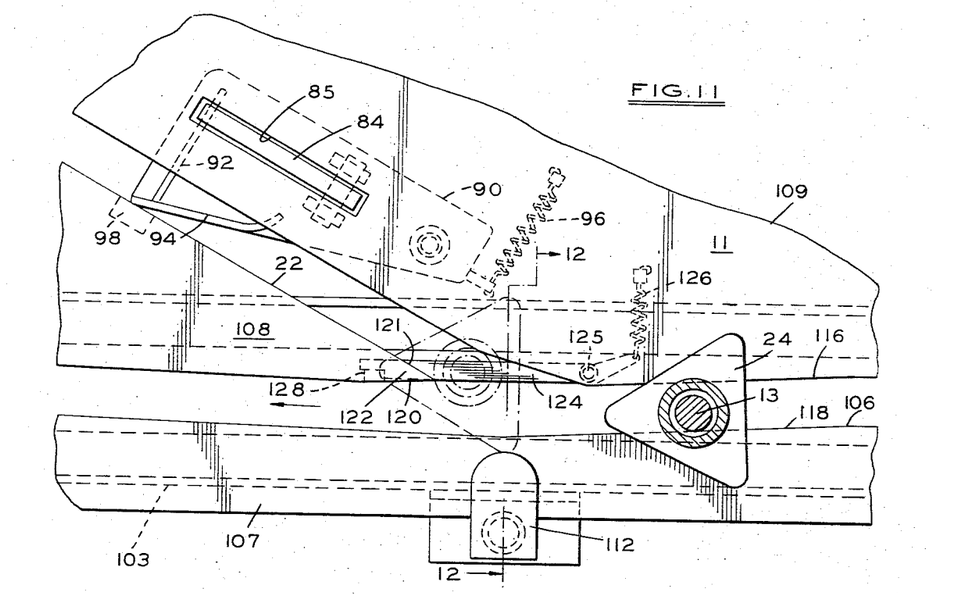
FIGURE 11 is a plan view of the intersection of main and branch guide slots showing another construction.
Figure 12:
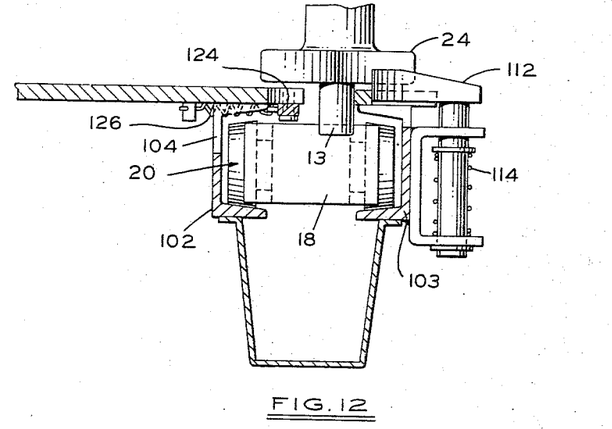
FIGURE 12 is a sectional elevation taken on the line 12—12 of FIG. 11.

FIGURES 11 and 12 illustrate a modified form of junction between main and branch line guide slots incorporating provisions for minimizing the possibility of a floor truck drive pin 13 wandering into the open end of a non-selected branch guide slot of a system.

A pair of channel section track members 102 and 103, which support the trolleys 20 of the tow line, extend through the junction in a straight path, a notch 104 being provided in the track member 102 where the track member passes under the branch guide slot 22. The main guide slot 106 however, defined by the sides of floor plates 107, 108 and 109, is provided with a portion, beginning in advance of the entrance to the branch guide slot, which is laterally offset relative to the path of travel of the tow line, and directed toward that side of the path of travel opposite to the side from which the branch guide slot 22 diverges.

A modified form of reaction member 112, located opposite the entrance to the branch guide slot 22, is depressible into a socket in the floor if engaged by other floor traffic, and is resiliently urged by a spring 114 to the raised, operative position shown.

When the drive pin of a floor truck approaching the junction enters the offset portion of the main guide slot, the drive pin 13 will first engage the guide slot side 116. A turning moment will be imparted to the floor truck 12 and to the caster type wheels at the front end thereof, steering the truck in a direction away from the branch guide slot 22 until the drive pin 13 engages the opposite side 118 of the main guide slot 106. The maximum extent of offset in the main guide slot is provided opposite the mouth of the branch guide slot and hence the drive pin 13 will tend to pass the mouth of the branch guide slot in engagement with the far side 118 of the main guide slot unless the branch guide slot is the one selected for the truck to enter and the truck diverter member 24 has been lowered to operative position for engagement with the reaction member 112.

To further provide against the possibility of a drive pin wandering into a non-selected guide slot, the sides 120 and 121 of the floor plate 108 which define the frog point 122 are formed at an angle greater than the angle of divergence between the center lines of the main and branch guide slots so that the main guide slot is wider than normal at the intersection of the sides of the frog point. Also, a gate member 124, mounted on a pivot 125 below the floor plate 109 may be employed to block the entrance to the branch guide slot 22. The gate member 124 is normally urged to a closed position by a relatively strong spring 126 which holds the gate member against a fixed stop 128. When a floor truck drive pin is moved laterally into a selected branch guide slot by engagement between the diverter member 24 and the reaction member 112, the resulting force on the diverted drive pin will easily overcome the force of the spring 126 and the gate 124 will be moved to open position by engagement of the diverted tow pin 13 therewith.

While a certain amount of centering effect on the drive pin 13 is obtained from the curved forward face of a pusher 18, as shown in FIG. 6, which would tend to prevent a drive pin from wandering into a non-selected branch guide slot, many factors arise in the actual operation of a system which could overcome this centering effect and result in unwanted entry of a drive pin into a branch guide slot. The features disclosed in FIGS. 11 and 12, augment the centering action between a pusher and a drive pin and cause a positive deflection of the drive pin away from the entrance to the branch slot, increase the distance through which a drive pin must be deflected in order to enter the branch guide slot and provide a yieldable barrier across the entrance which will normally open only if the drive pin is positively deflected into the branch guide slot in the desired manner of operation.

Those skilled in the art will appreciate that the present invention is also applicable to floor truck systems employing an overhead tow line, the pushers of which engage a drive pin of an upwardly projecting tow mast on each floor truck.

While preferred embodiments have been described above in detail, it will be understood that numerous modifications might be resorted to without departing from the scope of the invention as defined in the following claims.

I claim:

1. A device for diverting the drive pin of a floor truck from a main guide slot of a tow line along which the floor truck is propelled by a pusher of the tow line into a selected branch guide slot comprising
   (a) a diverter member,
   (b) means mounting the diverter member on the floor truck for normally urged movement relative to the drive pin from an inoperative position to an operative position,
   (c) latch means normally retaining the diverter member in the inoperative position thereof,
   (d) means for selectively releasing the latch means for normally urged movement of the diverter member to the operative position,
   (e) and a reaction member mounted in the path of floor truck travel adjacent the entrance to the branch guide slot for engagement by the diverter member in the operative position thereof to move the floor truck drive pin laterally out of engagement with a propelling tow line pusher and into the branch guide slot.

2. A floor truck diverting device as claimed in claim 1 wherein the diverter member includes a tubular portion concentric with the drive pin, and the means mounting the diverter member includes said tubular portion thereof and provides vertical sliding movement of the diverter member longitudinally of the drive pin between said inoperative and operative positions.

3. A floor truck diverting device as claimed in claim 1 wherein the diverter member includes a tubular portion having a latch element at the upper end thereof and a laterally extending wedge surface at the lower end thereof, said diverter member mounting means providing for sliding non-rotatable movement of the diverter member on the floor truck longitudinally of the drive pin between an upper inoperative position and a lower operative position.

4. A floor truck diverting device as claimed in claim 1 wherein the floor truck drive pin is slidably mounted in a sleeve rigidly secured to the floor truck for vertical sliding movement, said diverter member including a tubular portion slidably mounted on said sleeve.

5. A floor truck diverting device as claimed in claim 1 wherein the means for selectively releasing the latch means include a selector pin, a selector pin rack, means for positioning the selector pin in the selector pin rack in one of a plurality of locations spaced transversely of the floor truck, a trip button mounted in the path of floor truck movement for engagement by the selector pin in one of said locations, means mounting the selector pin rack on the floor truck for movement in response to such engagement of a selector pin and trip button, and means for releasing the latch means in response to such movement of the selector pin rack.

6. A floor truck diverting device as claimed in claim 1 further comprising a resetting means for returning the diverter member to inoperative position in response to movement of the floor truck along a branch guide slot.

7. A floor truck diverting device as claimed in claim 6 wherein said resetting means include a movably mounted actuating member normally extending into the path of drive pin travel for engagement thereby, a resetting cam, and means for moving the resetting cam into the path of travel of the diverter member upon engagement of said actuating member by a drive pin of a moving floor truck.

8. A floor truck diverting device as claimed in claim 1 wherein the diverter member is wedge-shaped, having a side surface extending laterally at an acute angle to the centerline of the main guide slot on each side thereof, said side surfaces converging in the direction of travel of the tow line.

9. A floor truck diverting device as claimed in claim 1, further comprising means for controlling the position of the drive pin of a floor truck in the main guide slot relative to the entrance portion of a branch guide slot which the floor truck is approaching to minimize any tendency of such drive pin to wander into a non-selected branch guide slot.

10. A floor truck diverting device as claimed in claim 9 wherein said controlling means comprises an offset portion provided in the main guide slot, said offset portion beginning in advance of the entrance portion of the branch guide slot and extending laterally in a direction opposite to the lateral direction of divergence of the branch guide slot from the main guide slot.

11. A floor truck diverting device as claimed in claim 9 wherein said controlling means includes a frog point at the intersection of the main and branch guide slots, said frog point having an angle between the sides thereof which is greater than the angle between the center lines of the main and branch guide slots, said frog point being mounted so as to provide an increased width of the main guide slot at the intersection of the sides of the frog point.

12. A floor truck diverting device as claimed in claim 9 wherein said controlling means comprises a gate member, means mounting the gate member adjacent the entrance of the branch guide slot for movement between a position in which the gate member closes said entrance and forms a continuation of the side of the main guide slot and a position in which the said entrance is open, and means biasing the gate member to closed position for opening movement in response to engagement by a floor truck drive pin moved laterally by engagement between said reaction and diverter members.

13. A device for diverting the drive pin of a floor truck from a main to a branch guide slot by engagement between a diverter member on the truck and a fixed reaction member in the path of travel along the main guide slot in response to forward movement of the floor truck along the main guide slot by a pusher of a tow line, and in which the floor truck drive pin is mounted for vertical movement in a sleeve rigidly secured to the floor truck; characterized by the diverter member having a tubular body portion with a latch element at the upper end thereof and a wedge surface extending laterally at the lower end thereof, said tubular portion engaging said sleeve and drive pin for free sliding movement relative thereto, means defining a lower operative position of said diverter member in which the wedge surface thereof is engageable with the reaction member, latch means carried by the floor truck and engageable with the latch element on the diverter member to define an upper inoperative position of the diverter member in which it is not engageable with a reaction member, and means for selectively releasing the latch means for normally urged movement of the diverter member to the operative position.

14. A floor truck diverting device as claimed in claim 13 further characterized by means for preventing relative rotational movement between the diverter member and the drive pin mounting sleeve.

15. A floor truck diverting device as claimed in claim 14 wherein the means for preventing relative rotational movement between the diverter member and drive pin mounting sleeve includes a mounting bracket secured to said sleeve, the tubular body portion of the diverter member being slotted to straddle said bracket.

16. A floor truck diverting device as claimed in claim 14 further characterized by the means for selectively releasing the latch means including a selector pin, a selector pin rack, means for positioning the selector pin in the selector pin rack in one of a plurality of locations spaced transversely of the floor truck, a trip button mounted in the path of floor truck movement for engagement by the selector pin in one of said locations, means mounting the selector pin rack on the floor truck for movement in response to such engagement of a selector pin and trip button, and means for releasing the latch means in response to such movement of the selector pin rack.

17. A floor truck diverting device as claimed in claim 14 further characterized by the means for selectively releasing the latch means including a pair of selector pins, a pair of selector pin racks, means for positioning each selector pin in one of the selector pin racks in one of a plurality of locations spaced transversely of the floor truck, a pair of trip buttons mounted in the path of floor truck movement and each engageable by a selector pin in one of said locations, means mounting the selector pin racks on either side of the floor truck drive pin for pivotal movement on an axis transverse of the floor truck between a latching and an unlatching position, means normally urging each selector pin rack to its latching position, and said latch means comprising a latch member carried by each selector pin rack, said latch members being engageable with the latch element on the diverter member in the latching position of the selector pin racks, each selector pin rack being pivotally movable to the unlatching position thereof upon engagement between a selector pin carried thereby and a trip button independently of such pivotal movement of the other selector pin rack.

18. A device for diverting the drive pin of a floor truck from a main guide slot of a tow line along which the floor truck is propelled by a pusher of the tow line into a branch guide slot comprising
  (a) a reaction member mounted alongside the main guide slot adjacent the entrance to the branch guide slot
  (b) a diverter member
  (c) means mounting the diverter member on the floor truck drive pin for movement relative thereto, and
  (d) a wedge surface on the diverter member extending at an acute angle to the main guide slot and adapted to engage the reaction member and move the drive pin of a floor truck laterally into the entrance of the branch guide slot as the drive pin is propelled forwardly by a pusher.

19. A device for diverting the drive pin of a floor truck from the guide slot of a tow line in a supporting surface along which the floor truck is propelled by a pusher of the tow line into a branch guide slot in the supporting surface comprising
  (a) a reaction member mounted on the supporting surface alongside the main guide slot adjacent the entrance to the branch guide slot,
  (b) a diverter member mounted above the supporting surface on the floor truck drive pin,
  (c) one of the reaction and diverter members being movable between an inoperative position in which it is non-engageable with the other member during movement of the floor truck along the main guide slot and an operative position in which the two members are engageable during such movement, and
  (d) means for selectively moving the one member to operative position in response to movement of a floor truck approaching the branch line.

20. A device for diverting the drive pin of a floor truck from a main guide slot of a tow line in a supporting surface along which the floor truck is propelled by a pusher of the tow line into a branch guide slot in the supporting surface comprising
  (a) a reaction member mounted on the supporting surface alongside the main guide slot adjacent the entrance to the branch guide slot
  (b) a diverter member
  (c) means mounting the diverter member above the supporting surface, on the floor truck drive pin for movement relative thereto, and
  (d) a wedge surface on one of the reaction and diverter members adapted to engage a surface on the other of said members and move the drive pin of a floor truck laterally into the entrance to the branch guide slot as the drive pin is propelled forwardly by a pusher.

21. In a floor truck tow line conveyor of the type wherein the drive pin of a floor truck is diverted from a main guide slot of a tow line along which the floor truck is propelled by a pusher of the tow line into a selected branch guide slot by engagement between a reaction member mounted in the path of floor truck travel and a diverter member mounted on the floor truck, means for controlling the position of the drive pin of a floor truck in the main guide slot relative to the entrance portion of a branch guide slot comprising an offset portion in the main guide slot, said offset portion beginning in advance of the entrance to the branch guide slot and extending in a direction laterally opposite to the direction in which the branch guide slot diverges from the main guide slot, said offset portion serving to turn the floor truck away from the entrance of the branch guide slot and place the drive pin thereof in engagement with the side wall of the main guide slot facing the side wall thereof from which the branch guide slot diverges or opens, thereby minimizing any tendency of such drive pin to wander into a non-selected branch guide slot.

22. In a floor truck drive line system including a junction between a main guide slot and a branch guide slot which diverges laterally to one side of the main guide slot, an offset portion in the main guide slot extending through said junction for directing a tow pin laterally toward the side of the main guide slot opposite to the side thereof from which the branch guide slot extends.

23. In a floor truck system including a main guide slot, a tow line beneath the main guide slot and having pushers for engaging and propelling the drive pin of a floor truck, and a junction at which a branch guide slot extends laterally from one side of the main guide slot, means defining a portion of the main guide slot extending through said junction in laterally offset relation to said tow line, said offset portion being within the width of a tow line pusher and being directed laterally away from the entrance of the branch guide slot.

References Cited

UNITED STATES PATENTS

| 2,936,718 | 5/1960 | Bradt et al. | 104—172 |
| 3,048,126 | 8/1962 | Salapatas | 104—130 X |
| 3,103,183 | 9/1963 | Bradt et al. | 104—172 X |
| 3,126,838 | 3/1964 | Bradt | 104—172 X |

ARTHUR L. LA POINT, *Primary Examiner.*

D. F. WORTH, *Assistant Examiner.*